United States Patent
Blond

(10) Patent No.: US 9,162,571 B2
(45) Date of Patent: Oct. 20, 2015

(54) DUAL DRIVE ARRANGEMENT FOR THE DRIVE OF A VEHICLE HYDRAULIC PUMP AND METHOD OF CONTROLLING THE SAME

(75) Inventor: Jean-Marc Blond, Saint Pierre De Chandieu (FR)

(73) Assignee: Volvo Trucks AB, Göteborg (SE)

( * ) Notice: Subject to any disclaimer, the term of this patent is extended or adjusted under 35 U.S.C. 154(b) by 141 days.

(21) Appl. No.: 13/977,381

(22) PCT Filed: Dec. 30, 2010

(86) PCT No.: PCT/IB2010/003509
§ 371 (c)(1),
(2), (4) Date: Jul. 5, 2013

(87) PCT Pub. No.: WO2012/090019
PCT Pub. Date: Jul. 5, 2012

(65) Prior Publication Data
US 2013/0281245 A1 Oct. 24, 2013

(51) Int. Cl.
*B60K 17/28* (2006.01)
*B60K 6/365* (2007.10)
*B60K 6/445* (2007.10)
(Continued)

(52) U.S. Cl.
CPC ............... *B60K 25/06* (2013.01); *B60W 10/30* (2013.01); *B60W 30/1888* (2013.01); *B60K 6/365* (2013.01); *B60K 6/445* (2013.01);
(Continued)

(58) Field of Classification Search
CPC ......... B60K 17/28; B60K 6/365; B60K 6/445
See application file for complete search history.

(56) References Cited

U.S. PATENT DOCUMENTS 3,966,005 A   6/1976   Binger
5,015,898 A * 5/1991   Frey ................................ 310/83

FOREIGN PATENT DOCUMENTS

DE   4204384 A1   8/1993
EP   1466773 A2   10/2004
(Continued)

OTHER PUBLICATIONS

Japanese Official Action (Jun. 6, 2014) for corresponding Japanese Application 2013-546770.
(Continued)

*Primary Examiner* — Tisha Lewis
(74) *Attorney, Agent, or Firm* — WRB-IP LLP

(57) ABSTRACT

A dual drive arrangement has three way power split device such as an epicyclic gearing system converting input rotation from a gearbox or from an electric motor into an output rotation driving a hydraulic pump. A method for controlling the dual drive arrangement driving a hydraulic pump includes setting a minimal flow value to the hydraulic pump, sensing the vehicle speed, processing the sensed vehicle speed where the processing includes comparing the sensed vehicle speed with a reference speed value to thereby determine whether the vehicle operates in a first operational mode I where the speed vehicle is too low to drive the hydraulic pump up to the minimal flow or in a second operational mode II where speed vehicle where the speed vehicle is sufficient to meet at least the minimal flow value, and controlling the operation of the epicyclic gear so that the electric source drives the hydraulic pump when the vehicle runs under the first operational mode I and at least the gearbox drives the hydraulic pump when the vehicle runs under the second operational mode II.

3 Claims, 2 Drawing Sheets

(51) Int. Cl.
*B60K 25/06* (2006.01)
*B60W 10/30* (2006.01)
*B60W 30/188* (2012.01)
*F16H 3/72* (2006.01)
*B60W 20/00* (2006.01)

(52) U.S. Cl.
CPC ............... *B60K 17/28* (2013.01); *B60W 20/00* (2013.01); *F16H 3/724* (2013.01)

(56) References Cited

FOREIGN PATENT DOCUMENTS

| EP | 1707418 A2 | 10/2006 |
|----|------------|---------|
| JP | S61-198176 | 11/1986 |
| JP | 2-500928 | 3/1990 |
| JP | 11-107936 | 4/1999 |
| JP | 2005-273902 | 10/2005 |
| WO | 8911405 A1 | 11/1989 |
| WO | 2011010182 A1 | 1/2011 |

OTHER PUBLICATIONS

JPH02500928 (A)—Mar. 29, 1990 (corresponds to U.S. Pat. No. 5015898 listed above).
Patent Abstracts of Japan (Apr. 20, 1999) JP 11-107936 Koyo Seiko Co. Ltd.
International Search Report (Aug. 17, 2011) for corresponding International application No. PCT/I82010/003509.
Japanese Official Action (Mar. 30, 2015) (translation) for corresponding Japanese Application 2013-546770.

* cited by examiner

DUAL DRIVE ARRANGEMENT FOR THE DRIVE OF A VEHICLE HYDRAULIC PUMP AND METHOD OF CONTROLLING THE SAME

BACKGROUND AND SUMMARY

The invention relates to a dual drive arrangement for the drive of a vehicle hydraulic pump, especially a power steering hydraulic pump, and a method for controlling the same.

Modern vehicles are equipped with peripheral components such as a power steering system that can be hydraulically powered.

Power steering systems have been a standard feature in vehicles for many years, in light vehicles and in industrial vehicles.

A power system steering assists the vehicle driver by applying a force to the wheels, through a hydraulic steering actuator. Therefore, a lower effort is required for the driver when turning the steering wheel and the vehicle is therefore easier to manoeuvre.

A power steering system typically comprises a hydraulic circuit carrying a pressurized fluid—such as oil—from a tank to the steering actuator, by means of a pump.

Conventionally, the pump is mechanically driven by the vehicle internal combustion engine, generally gear driven or belt-driven by said engine.

Recent years have seen the emergence of hybrid vehicles which help containing the emissions released by IC engines.

Hybrid vehicles are complex and are of different types. However they all rely on the principle of two or more distinct power sources to move the vehicle. Hybrid vehicles combine an internal combustion engine and one or more electric traction motors.

Thus, a hybrid vehicle can be driven by the internal combustion engine or by the electric motor(s) or by both internal combustion engine and electric motor(s).

In urban driving conditions where emissions should be avoided, it is desirable to drive the vehicle on the electric motor(s) while the internal combustion engine is turned off.

This however causes a problem for the vehicular peripheral components such as the power steering that are normally driven by the internal combustion engine.

Power steering systems can be electrically driven by an auxiliary electric motor. This however has several drawbacks linked to the availability of electric power supply and/or to the reliability of electrical components such as the electric motor or the power supply system.

It therefore appears that, from several standpoints, there is room for improvement in power steering systems.

It is desirable to provide an improved arrangement and an improved method to drive a hydraulic pump especially for a power steering system.

The invention relates, according to an aspect thereof, to a dual drive arrangement for the drive of a hydraulic pump for a vehicle having a gearbox driven by an internal combustion engine said gearbox having an output for mechanically driving driven wheels of the vehicle and said vehicle having an auxiliary electric motor for driving the hydraulic pump. The arrangement further has a three way power split system converting input rotation from the gearbox output and from the auxiliary electric motor into an output rotation driving the hydraulic pump.

The three way power split system may comprise an epicyclic gearing system or a differential.

Thus the invention, according to an aspect thereof, provides an arrangement that ensures a hydraulic pump can be driven by two alternate or combined energy sources. By fitting an epicyclic gearing system between on one side a vehicle gearbox output and an auxiliary electric motor and on the other side a hydraulic pump, the invention, according to an aspect thereof, offers a novel arrangement that ensures that the said hydraulic pump can be driven irrespective of the gearbox output rotational status. In other terms, the auxiliary electric motor can drive the hydraulic pump alone or in combination with the gearbox output so as to ensure that the hydraulic pump can be constantly driven even when the internal combustion engine is turned off and even if the vehicle is at standstill. The arrangement of an aspect of the invention is thus especially useful for hybrid vehicles which can be propelled purely by an electric source.

According to an embodiment of an aspect of the invention, the epicyclic gearing system has a central gear with outward facing teeth driven by the gear box, an outer gear with inward facing teeth driven by the electric power source, a planet carrier holding one or more planet gears meshed with the central gear and with the outer gear driving the hydraulic pump.

Preferably, the auxiliary electric motor drives a worm gear that meshes with outward facing teeth provided on the outer gear. Thus, in case of a failure in the electric power source, outer gear is locked while the central gear can be driven by the gearbox.

The electric motor can be powered by vehicle batteries.

The arrangement can suitably comprise an electronic control unit capable of controlling the electric motor.

The arrangement comprises a speed sensor connected to the electronic control unit that senses the rotational speed of the gearbox output shaft.

Another aspect of the invention concerns a method for controlling the said dual drive arrangement driving a hydraulic pump. The method comprises the steps of:

setting a minimal flow value to the hydraulic pump;

sensing the vehicle speed;

processing the sensed vehicle speed where the processing comprises comparing the sensed vehicle speed with a reference speed value to thereby determine whether the vehicle operates in a first operational mode where the speed vehicle is too low to drive the hydraulic pump alone up to the minimal flow or in a second operational mode where the speed vehicle is sufficient alone to meet at least the minimal flow value;

controlling the operation of the epicyclic gear so that the auxiliary electric motor drives the hydraulic pump in combination with the gearbox output when the vehicle rims under the first operational mode and the gearbox output drives the hydraulic pump alone when the vehicle runs under the second operational mode.

In a first scenario, the gearbox drives the hydraulic pump alone when the vehicle runs under the second operational mode.

In second scenario, the gearbox and the electric motor controlled in a reverse direction drive in combination the hydraulic pump when the vehicle runs under the second operational mode.

BRIEF DESCRIPTION OF THE DRAWINGS

The following detailed description of an embodiment of the invention is better understood when read in conjunction with the appended drawings being understood, however, that the invention is not limited to this embodiment.

DETAILED DESCRIPTION

Figure 1:
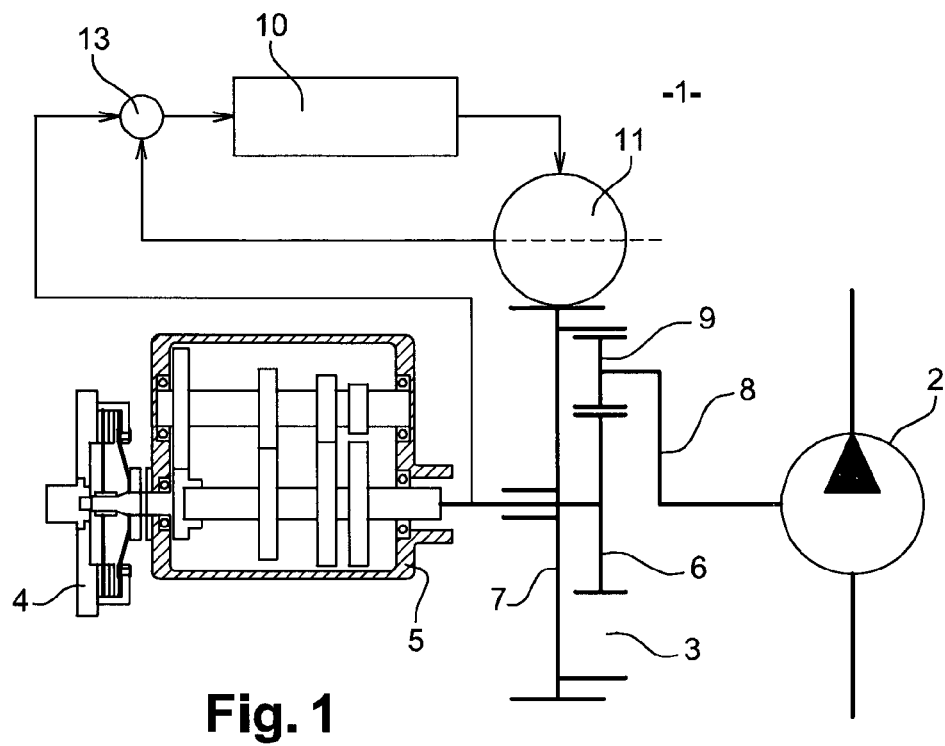
FIG. 1 is a schematic and partial drawing of a vehicle having a dual drive arrangement for a hydraulic pump according to the invention.

FIG. 1 shows a dual drive arrangement 1 for the drive of a hydraulic pump 2 of a vehicle. The vehicle is partially shown on FIG. 1.

Such a vehicle comprises an internal combustion engine which is connected to a clutch 4 and a gearbox 5. When the internal combustion engine is turned off, the clutch 4 can be opened. When the engine is running, with the clutch being closed and with a gear ratio of the gearbox being engaged, a gearbox output shaft can drive the driven wheels of the vehicle though a driveline which can comprise a drive shaft, a differential for driving two wheel shafts, each connected to a driven wheel. In other words, as long as the vehicle is not at standstill, the output of the gearbox is rotating at a speed which is proportional to the vehicle speed. It can be noted that the invention can be implemented whatever the type and the architecture of die gearbox, be" it a manual gearbox, an automated manual gearbox, a dual clutch transmission, an automatic gearbox, etc.

As illustrated on FIG. 1, the vehicle is provided with a hydraulic pump 2 which can be part for example of a power steering system (not shown).

As it will be apparent, the hydraulic pump 2 can be driven by two power sources thanks to the dual drive arrangement of the invention.

One of the power sources is the vehicle internal combustion engine while the other power source is provided by one or more battery that delivers electricity to an auxiliary electric motor 10. In the case of a hybrid vehicle, the battery may be a high voltage battery also used to propel the vehicle either individually or in combination with the internal combustion engine. On the other hand, in a hybrid vehicle, the auxiliary electric motor 10 is distinct from a traction electric motor.

The dual drive arrangement 1 includes a three way power split system. Such systems, which can for example be in the form of an epicyclic gearing system or of a differential, have at least three input/output couplings. In such a gear, the speed of the three inputs/outputs are linked one to the other. Basically, the speed of one of the input/outputs is a linear combination of the speeds of the other two input/outputs In the shown example, the three way power split system is embodied as an epicyclic gearing system 3. The epicyclic gearing system 3 has three components:
- a central gear 6, often named sun gear, with outward facing gear, is for example driven by the gear box 5 output, meaning that it rotates at a speed which is proportional to the speed of the driven wheels, i.e. proportional to the vehicle speed in most cases,
- an outer gear 7 with inward facing teeth, often called ring gear, which is for example driven by an auxiliary electric motor 10,
- a planet carrier 8 holding one or more planet gears 9 meshed with the central gear and with the outer gear 7 driving the hydraulic pump 2.

Figure 2:
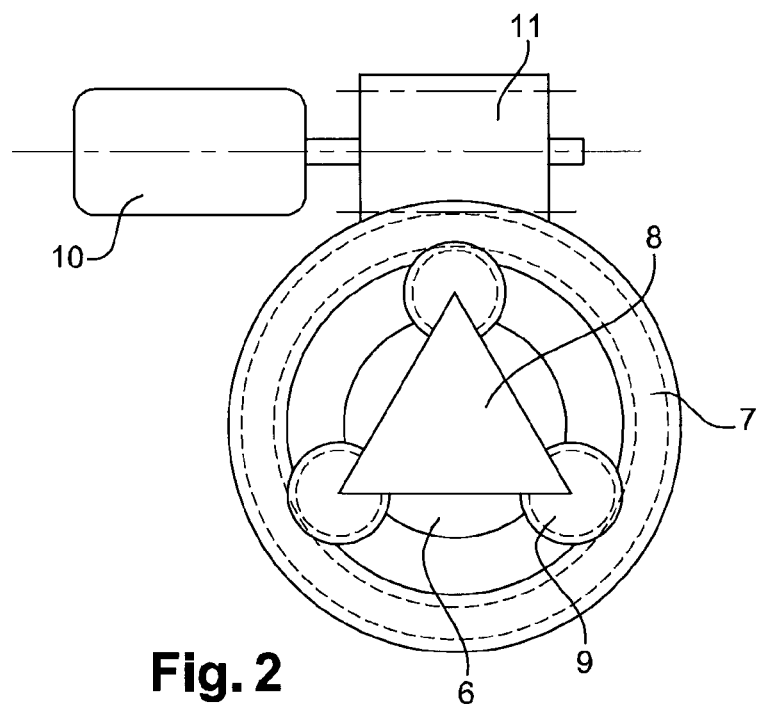
FIG. 2 shows an epicyclic gearing system of the dual drive arrangement.

It can be noted that the outer gear 7 is also provided with outward facing teeth as it can be seen on FIG. 2. Thus, the connection between the electric motor 10 is provided by a worm gear 11 that is linked to a shaft of the auxiliary electric motor 10; the worm gear 11 can be meshed with the outer gear 7 and drives the outer gear 7 of the epicyclic gearing system 3. The worm gear system has the known property of being irreversible, so that, even if not torque is applied by the auxiliary electric motor to the worm gear, the outer gear 7 will remain at standstill, whatever the torques which may be applied on the other two input/output couplings of the three way power split device.

In the dual drive arrangement described on the figures, the outer gear 7 and the central gear 6 are used essentially as inputs of power, torque, and/or movement, and the planet carrier 8 is used as output.

The outer gear 7 can be used as an input while the central gear 6 is stationary, i.e.; when the vehicle is at standstill. In this case, the electric motor 10 drives the hydraulic pump 2, Another situation is when the outer gear 7 is stationary, i.e. when the auxiliary electric motor 10 delivers no torque to drive the hydraulic pump. In this case the central gear 6 is used as an input for the hydraulic pump 2, as long as the vehicle is not at standstill.

The dual drive arrangement of the invention makes it possible to drive a hydraulic pump 2 through a choice of sources namely a vehicle gear box 5 output when the vehicle is not at standstill and an auxiliary electric motor 10 when it is not at standstill. Advantageously, the dual drive arrangement can use both sources of movement simultaneously to drive the hydraulic pump at an optimal speed, the auxiliary electric motor 10 being then used to complement the gearbox for the amount of speed it cannot deliver.

Another aspect of the invention is thus a method for controlling the dual drive arrangement.

In any power steering system, an important parameter is the minimal flow value Qm which has to be delivered by the hydraulic pump 2 to operate the hydraulic steering actuator. From a safety point of view it is important that the power steering system is constantly fed with hydraulic flow.

As it can be seen on FIG. 1, the dual drive arrangement also includes an electronic control unit 13 that suitably comprises a microprocessor with I/O interface, CPU, ROM and RAM.

A rotational speed sensor 14 monitors the speed of the gearbox output shaft. The gearbox rotational speed is fed into the electronic control unit 13 where the sensed vehicle speed is compared with a reference speed value; this is to determine whether the vehicle operates in a first operational mode I where the speed vehicle is too low to drive the hydraulic pump 2 alone up to the minimal flow or in a second operational mode II where the speed vehicle is sufficient alone to meet at least the minimal flow value Qm.

If the gearbox 5 is found to be rotating below a reference speed value, the vehicle runs in a first operational mode I; the hydraulic pump 2 cannot be driven by the gearbox 5 output alone to meet the minimal flow value Qm, the electronic control unit 13 switches on the electric motor 10; the hydraulic pump 7 is therefore driven by the electric motor 10 and by the gearbox output as long as it is not at standstill.

On the other hand, if the gearbox is found to be rotating above the reference speed value, the vehicle runs in a second operational mode II; the hydraulic pump 2 can be driven solely by the gearbox 5 output to meet the minimal flow value Qm, the electronic control unit 13 can turn to electric motor off so that the outer gear 7 is held stationary; accordingly, the hydraulic pump 2 can be driven by the gearbox 5.

Figure 3:
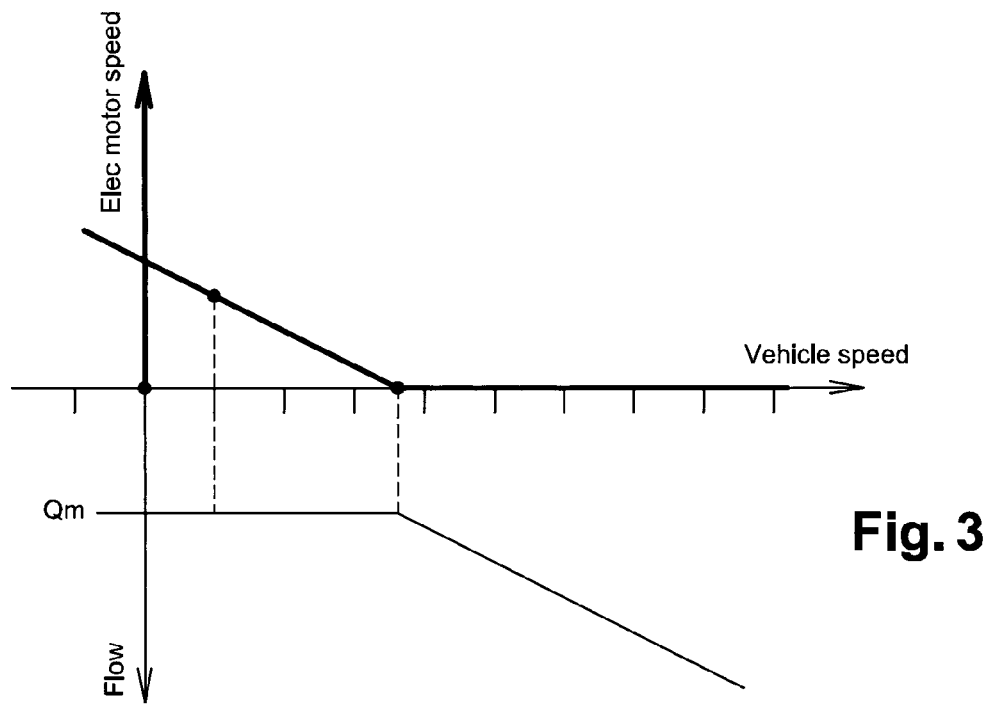
FIGS. 3 and 4 are two a diagrams illustrating the flow rate of the hydraulic pump as a function of the vehicle speed according to two preferred operational modes.

FIG. 3 illustrates the fluid flow Q from the hydraulic pump 2 as a function of the vehicle speed V.

The hydraulic pump 2 delivers a flow depending on the combination of the speed of the auxiliary electric motor 10 and of the vehicle speed, as the latter is proportional to the speed of the gearbox output shaft;

In the first operational mode I where the vehicle is running at low speed or when the internal combustion engine is not running, it is needed to use the electric motor 10 to complement the inability of the gearbox output shaft to deliver enough speed. It can be noted that when the internal combustion engine is turned off, the dual drive arrangement of the invention makes it possible to drive the hydraulic pump 2 purely by an electric motor 10. The auxiliary electric motor 10 is then controlled to run at a certain speed so that the pump delivers the required minimal flow Qm. This proves to be especially advantageous for a hybrid vehicle which can run purely on batteries. The power steering function is thus maintained. As soon as the vehicle starts rolling, the gearbox output shaft starts to deliver some movement on its input to the three way power split device. Thereby, if it chosen to maintain the flow of hydraulic fluid only at the minimal level Qm, then it is possible to control the electric motor at a progressively lower speed, in parallel to the vehicle speed increase.

In the second operational mode II where the vehicle is running at high speed—for example above 20 km/h—the hydraulic pump 2 can be driven by the gearbox output shaft. The shift from mode I to mode II can occur when the vehicle speed reaches the value for which the movement delivered by the gearbox output is sufficient to drive the hydraulic pump at a speed at which it generates the required minimal flow Qm.

In the control method shown on FIG. 3, the electric motor is then stopped and the flow of hydraulic fluid delivered by the pump continues to increase, above the minimal value Qm, together with the vehicle speed. Nevertheless, at some point, it may be required to set an upper limit for the flow delivered by the pump, for example through a regulating valve, a flow limiter, or through the use of a variable capacity pump.

Figure 4:
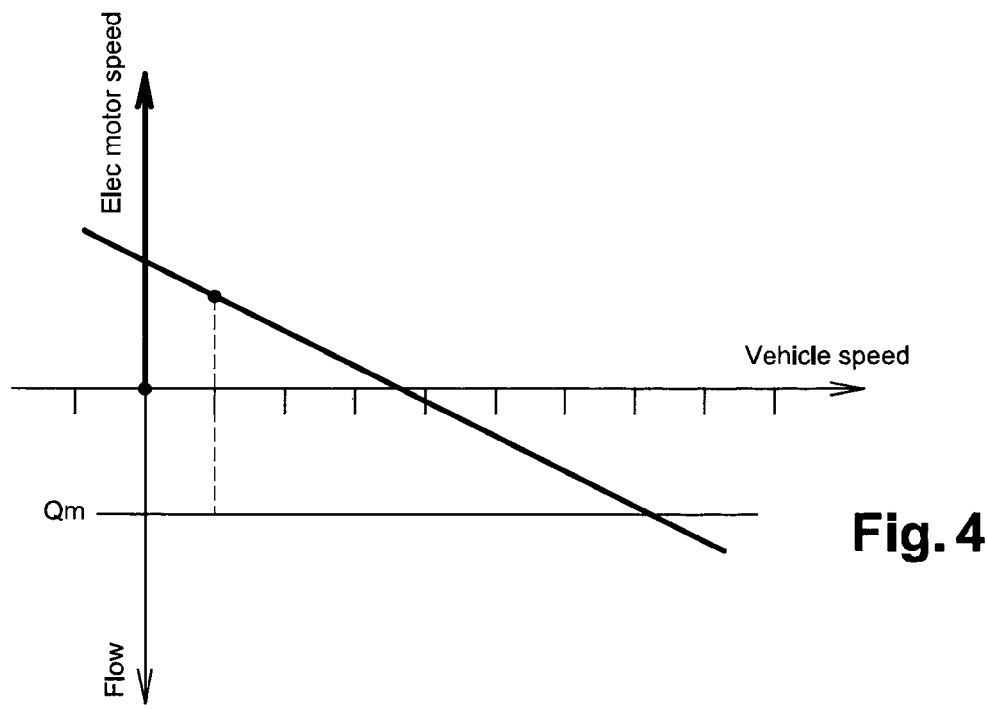

In the control method represented on FIG. 4, the system is operated in the same way as in the first operational mode, i.e. as long as the vehicle speed is too low for the gearbox output to deliver alone enough speed to the hydraulic pump.

On the other hand, it can be seen that, in second operational mode II, the auxiliary electric motor is now controlled to rotate in a reverse direction, so that, thanks to the three way power split device, its speed is in fact subtracted from the gearbox output speed when driving the hydraulic pump. The reverse speed of the electric motor can be chosen to be proportional to the vehicle speed, as shown in FIG. 4, and the proportional rate can be chosen so that the pump is driven at a substantially constant speed and thus delivers a substantially constant flow rate of oil.

In this scenario shown on FIG. 4, there is no need to equip the hydraulic pump 2 with a flow regulating valve. The regulation is carried out by the electric motor 10. Thus an important advantage of the invention is that the dual drive arrangement makes it possible to use a less sophisticated pump such as a vane pump rather than a more sophisticated and expensive pump such as a piston pump.

In any case, should there be an electrical failure, the gearbox output provides a mechanical back up.

The invention is not restricted to the embodiments described above by way of non-limiting examples, but on the contrary it encompasses all embodiments thereof.

The invention claimed is:

1. A method for controlling a dual drive arrangement for driving of a hydraulic pump for a vehicle having a gearbox driven by an internal combustion engine, the gearbox having an output for mechanically driving driven wheels of the vehicle and the vehicle having an auxiliary electric motor for driving the hydraulic pump, the arrangement comprising a three way power split system converting input rotation from the gearbox output and from the auxiliary electric motor into an output rotation driving the hydraulic pump, the method comprising:

setting a minimal flow value to the hydraulic pump;
  sensing the vehicle speed;
  processing the sensed vehicle speed where the processing comprises comparing the sensed vehicle speed with a reference speed value to thereby determine whether the vehicle operates in a first operational mode I where the speed vehicle is too low to drive the hydraulic pump alone up to the minimal flow value or in a second operational mode II where vehicle speed is sufficient alone to meet at least the minimal flow value;
  controlling the operation of the three way power split system so that the auxiliary electric motor drives the hydraulic pump in combination with the gearbox output when the vehicle runs under the first operational mode I and at least the gearbox output drives the hydraulic pump when the vehicle runs under the second operational mode II.

2. The method according to claim 1, wherein the gearbox drives the hydraulic pump alone when the vehicle runs under the second operational mode II.

3. The method according to claim 1, wherein the gearbox output and the electric motor controlled in a reverse direction drive in combination the hydraulic pump when the vehicle runs under the second operational mode II.

* * * * *